Nov. 1, 1955
W. D. MACGEORGE ET AL
2,722,234
POPPET VALVES
Filed July 17, 1952
2 Sheets-Sheet 1
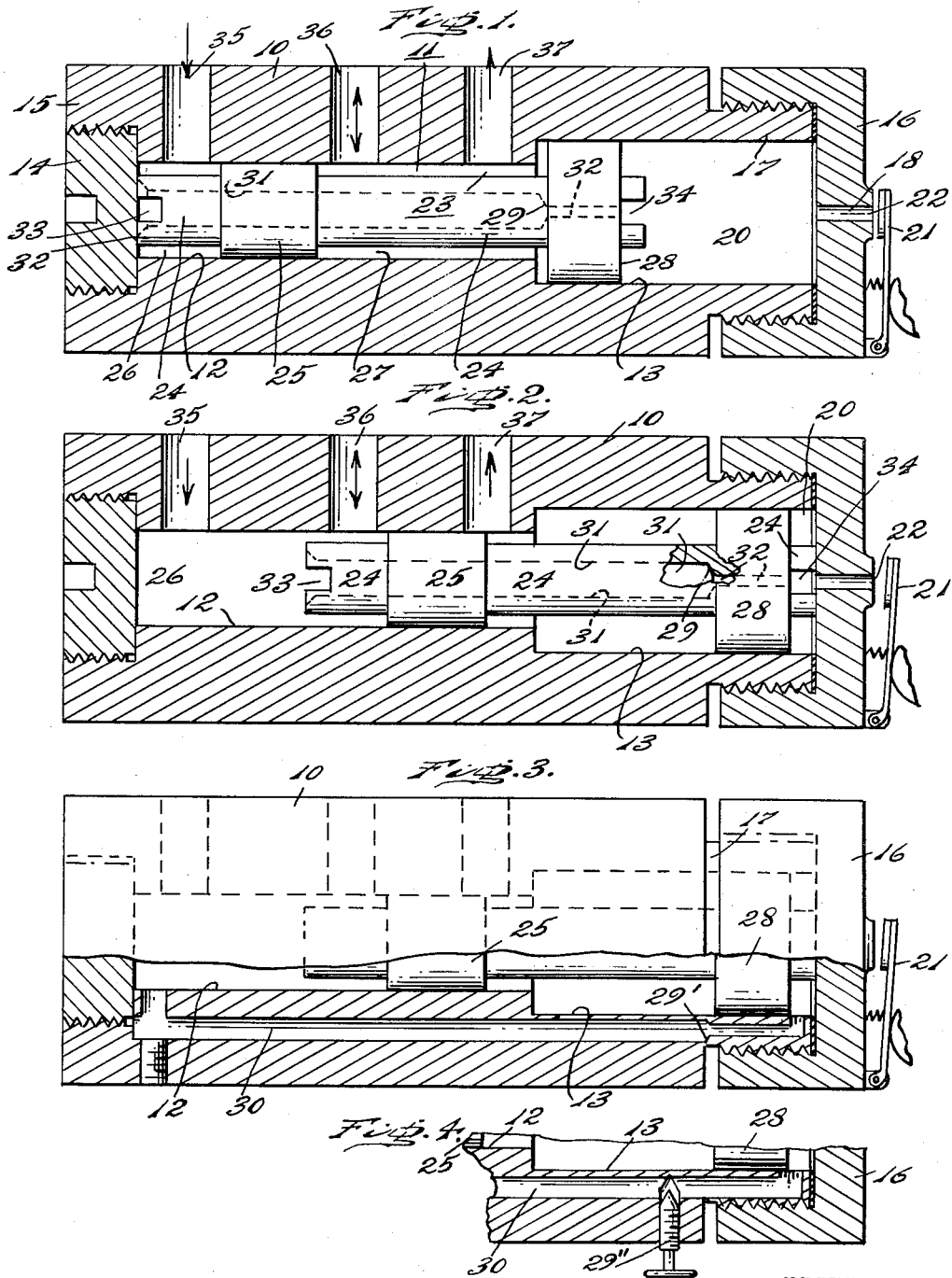
INVENTORS.
William D. Macgeorge
Everett R. Brown.
BY
Frank H. Borden
ATTORNEY

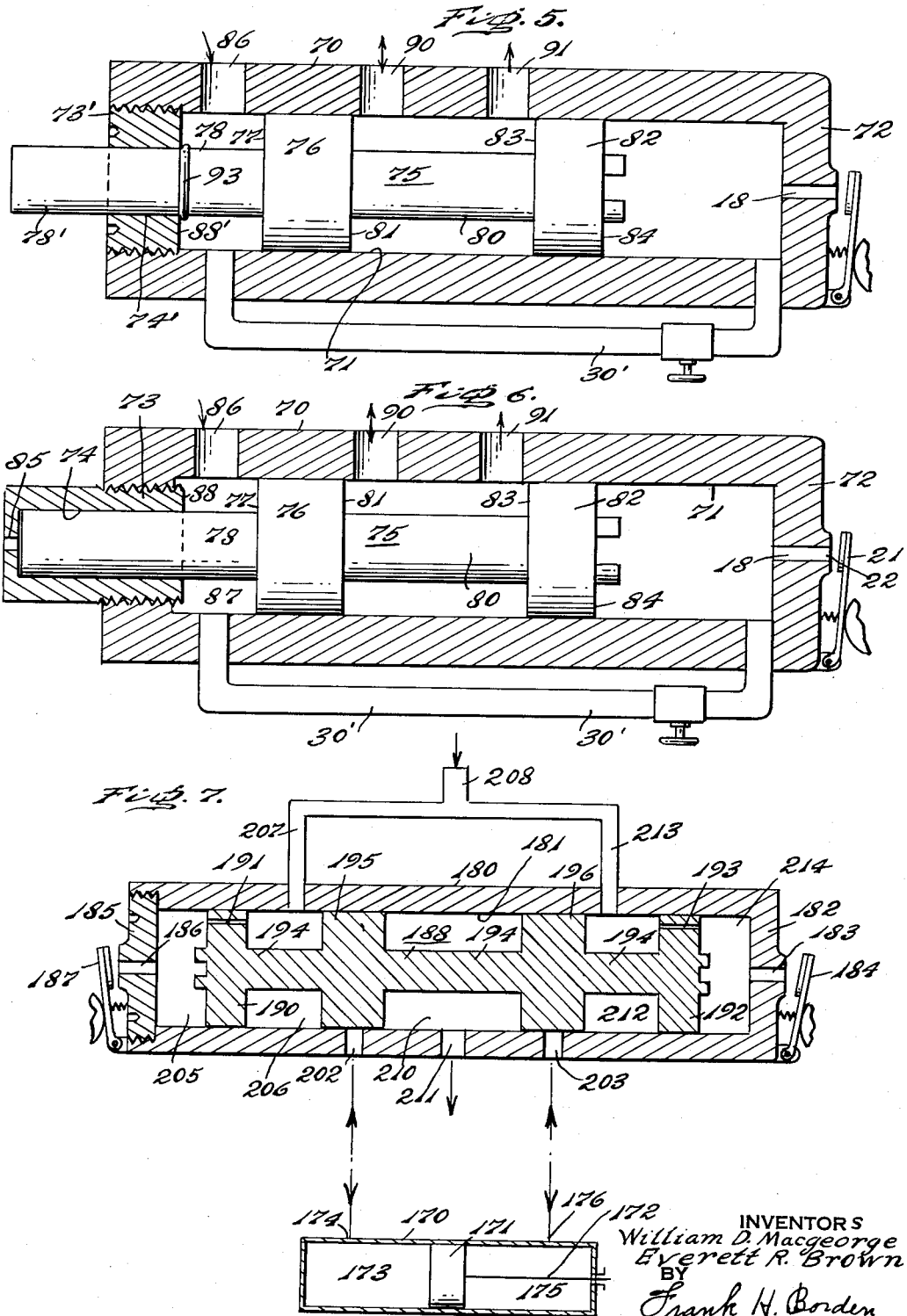

United States Patent Office 2,722,234
Patented Nov. 1, 1955

2,722,234

POPPET VALVES

William D. MacGeorge, Collegeville, and Everett R. Brown, Warrington, Pa., assignors to Automatic Temperature Control Co., Inc., Philadelphia, Pa., a corporation of Pennsylvania Application July 17, 1952, Serial No. 299,404

5 Claims. (Cl. 137—620)

This invention relates to poppet valves for pneumatic control systems.

Pneumatic control systems as presently developed rely upon variations in pressures for effecting a control function. Usually the pressure drop or rise is occasioned by the change of position of a flapper valve relative to a bleed orifice. It is desirable to effect a trigger action response of the poppet valve to a pressure change such as is caused as a function of the movement of a control element responsible to changes in a variable. In a simple form of the invention the poppet valve of the invention is controlled by some such device as a cam on a shaft or the like controlled by a variable, in a purely illustrative embodiment.

As such poppet valves have been developed hitherto, the action has been far less than "trigger." That is, the development of controlling pressure from a cam has been so slow that always in the past so far as known there has been a definite lag or the passage of a time interval between the start of the control function and the time when it becomes operative on the pneumatic system. A snap action, in which the valve is actuated between two opposite limits as a response to predetermined instantaneous relative pressure conditions is provided herein.

It is among the objects of this invention; to improve poppet valves; to provide a poppet valve useful as a pneumatic control regulator and also as an air relay or amplifier; to provide a poppet valve organization which is almost instantaneously responsive to changes of pressure effective on the valve; to provide a stemless poppet valve, in which there is no solid connection between the movable valve element and a controlling movable member; to provide a poppet valve with at least one pressure chamber and so organized that variations in pressure in such chamber effect actuation of the valve; to provide a poppet valve with a housing containing a piston forming a pressure chamber into which fluid pressure passes through an instantaneously fixed orifice and from which fluid pressure is controllably bled at a variable rate and by the instantaneous pressure in the chamber the piston position is controlled; to provide a poppet valve movable in response to unbalanced forces effective on a piston.

In carrying out the invention in an illustrative embodiment a housing is provided having an axial bore, a piston device is slidable in the bore having surfaces and relative fluid pressure arrangements whereby the piston device moves in the bore in both directions as functions of changes of pressure effective on parts of the piston device, with ports in the housing selectively placed in or out of relative respective communications in accordance with the setting of the piston device.

In the accompanying drawings forming part of this description:

Fig. 1 represents a longitudinal diametric section through one form of the poppet valve using a bore and piston device of two different diameters, with the piston shown at the upstream end of the assembly, and with the instrument fluid pressure inlet port separated from the load port, communicating with the expansible agency to be controlled by the valve, but with the latter in communication with the exhaust port, with a communication between chambers at ends of the piston passing through the piston.

Fig. 2 represents a similar section of the same device but with the piston device in the downstream position in the housing, with the instrument fluid pressure inlet port placed in communication with the port for the expansible agency to be controlled, and with the exhaust port out of communication with the latter port.

Fig. 3 represents an elevation partially in section of a modified form of the invention, showing a by-pass conduit between the ends of the bore, passing through a restricting orifice.

Fig. 4 represents a fragmentary section through a still further modification of the device of Fig. 3, in which the orifice restriction is controllable as by a needle valve.

Fig. 5 represents another form of the invention in which both the piston device and the bore are of the same diameters, with an end of the piston extending outwardly of the housing either as a position indication signal, or for actuation of a signal transmitter.

Fig. 6 represents a modified form of the device of Fig. 5 in which the piston device is completely contained within the housing.

Fig. 7 represents a four-way valve assembly with a controlled device in association therewith, responsive to variations of two different bleed devices for actuating the controlled device.

In the illustrative embodiment of the invention shown in Fig. 1, a housing 10 is provided having the internal chamber 11, formed of the relatively small bore 12, merging downstreamwardly into the relatively larger bore 13. The smaller bore 12 is closed by the threaded plug 14, fitting into a threaded bore enlargement 15. The larger bore 13 is closed as for instance by a threaded cap 16 secured upon a reduced externally threaded portion 17 of the housing 10. The threaded cap 16 is provided, usually, but not essentially, in the center, with a bleed orifice 18, extending completely through the cap so that the inner end thereof communicates with a chamber 20 in large bore 13 and the outer end 22 thereof communicates with the external atmosphere. A flapper or similar throttling valve device 21 is provided for controlled movement relative to the jet end 22, of the bleed orifice, for controlling the pressure in the chamber 20. While the details of the flapper valve 21 are not of importance in this application, it will be understood that the relative position of the flapper valve unit 21 to the exit jet 22 of the orifice 18 will be controlled as a function of change of condition of a variable, whether controlled directly thereby, as with pressure and like devices, or as controlled by the instantaneous position of a cam or the like follower member. It will be understood that fluid pressure incident in chamber 20 is bled out of the orifice 18, or by the restriction of the orifice end 22 thereof by flapper 21 to build up in the chamber 20.

A piston unit 23 is provided, having a shank or rod 24 of smaller diameter than the small bore 12 so as to effect clearance therewith. The piston device has a small piston 25 spaced from the upstream end of the rod and of such diameter and so dimensioned and provided as to have sliding sealed engagement with the internal surface of the bore 12. The piston 25 is of such axial length and is so placed as regards the total axial length of the shank 24 as to effect cylindrical clearance space 26 on the upstream side of the piston 25, of relatively short extent, and space 27 of relatively long extent, on the other or downstream side of the piston 25. The shank or rod 24 at the outer or downstream end mounts a larger piston 28, slidable sealingly in the larger bore 13 of the housing, and forming with surface of bore 13 in the housing, and end cap 16, the said chamber 20.

It is desired that a free flow of fluid pressure between chambers 26 and 20 be effected, and, while as shown in Fig. 3 this can be effected by a by-pass passage between these chambers, as indicated at 30, this requires extra drilling of the housing, or extra piping partially externally of the housing, and it may be preferred to effect it through the piston device itself. Thus a transfer bore or conduit 31, of relatively large diameter, passes axially through the piston device from the upstream end 32 of rod 24, provided for abutment against the plug 14, while maintaining the spacing of piston 25 therefrom, toward and adjacent the large piston, at about which point the bore is sharply constricted as at 29, to pass as an orifice 32 through the large piston and to communication with the chamber 20 at the downstream end of the piston unit. Of course the constriction 29 can be formed wherever desired. Transverse ports are provided in the respective end extensions of rod 24, communicating with the respective portions of the axial channel or passage, as shown at 33 adjacent to the small piston communicating with the bore 31, in all positions of the piston device in the housing, and at 34 adjacent to the large piston communicating with the orifice 32 in all piston positions. An instrument fluid pressure inlet port 35 is provided in the housing, always in communication with the upstream chamber 26, in all piston positions, and, in due course, through the transfer passage into chamber 20, so that with the flapper valve 21 closed, identical pressures will exist in both upstream chamber 26, and in the downstream chamber 20. In this situation, as shown in Fig. 1, although the input fluid pressure in chamber 26 exerts an effective force against the piston 25 in a downstream axial direction, as a function of the pressure and the effective area of the face of piston 25, this force is overbalanced by the greater effective upstream force on piston 28 as a function of the same pressure and the greater area of piston 28. A load port 36 is provided in the housing which leads for both pressure and exhaust passage of fluid to the energized pneumatic agency to be controlled, say to one side of the operating piston in a working cylinder as shown at the lower end of Fig. 7, for instance. An exhaust port 37 is provided in the housing. In the position shown in Fig. 1, the load port and the exhaust port both communicate with each other through chamber 27, out of communication with the inlet port 35. Let it be assumed that there is a change of condition or time or the like causing the flapper valve 21 to move away from jet orifice 22, as exaggeratedly shown in Fig. 2, causing a decrease of pressure in chamber 20 and of course a decrease in the force effective on large piston 28. When the bleed rate has attained a predetermined value there is an instantaneous reversal of the preponderating forces on the piston, in that the effective force from piston 28 is smaller than that effective from piston 25, and the piston device snaps to the other downstream setting as shown in Fig. 2.

Due to the restriction 29 in the passage 31—32, the fluid pressure in the chamber 26 cannot pass quickly into chamber 20, so that with maintenance of a bleed rate from jet orifice 22 higher than the bleed rate through restriction 29, the pressure in chamber 20 will continue to be the predetermined smaller value necessary to hold the piston device 23 in the downstream position. In this setting of the poppet valve, as shown in Fig. 2, the load port 36 is in communication with chamber 26 and thus with the inlet port 35 so that the full fluid pressure from the latter port is incident on the load, i. e. on one side of a two sided pressure responsive agency. Simultaneously, of course, the exhaust port 37 is out of communication with load port 36.

This condition maintains until with movement of the flapper valve 21 the jet 22 is throttled to a degree at which the bleed from chamber 20 is of a smaller value than that through orifice 29, when the pressure starts building up in chamber 20 toward equality with that in chamber 26, and at a predetermined relative pressure in said respective chambers the piston snaps to the upstream position of Fig. 1. It is not too much to say that the poppet valve just described is so analogous in "trigger" response, to electrical functioning, that the poppet valve is in effect a pneumatic "Thyratron."

Reference has been made to the modified form of the communication between the chambers 26 and 20. As shown in Fig. 3, the passage is extraneous of the piston device, and has a restriction 29′ formed therein between the ends of the passage in their communications with the bore.

In the further modified form of by-pass passage shown in Fig. 4, the passage 30 is substantially the same as in Fig. 3, except that the restriction therein is formed by an adjustable needle valve 29″, by which the rate of transfer of pressure between the chambers of the valve can be controlled.

It will be apparent that within the broad scope of the invention many changes and modifications can be made, effecting similar or modified results. Thus it will be seen that although the piston unit having pistons of two different diameters may be preferred, it does involve some accurate machining operations. In order to effect the same snap action with simpler machining operations it will be seen that a device such as shown in Figs. 5 and 6 may be resorted to. In the illustrative embodiment of a modified form of the invention shown in Figs. 5 and 6, a housing 70 is provided having a cylindrical bore 71 of uniform diameter throughout its working portion. The same general bleed end closure is provided as in the earlier figures, as generally designated at 72, while the opposite end closure 73 has a gland or sealing piston-rod-receiving bore portion 74. The piston unit 75 comprises an upstream piston device 76, from the upstream face 77 of which a piston rod 78 extends for slidable sealed sliding in the bore 74. A connecting rod portion 80 extends from the downstream face 81 of the piston device 76 and mounts the downstream piston device 82, having the upstream face 83 and the downstream face 84. The end closure 73 in Fig. 6 has a vent port or the like 85 and forms a stop for the upstream movement of the piston rod extension 78. The latter is freely movable in the guide bore 74, pushing air out of or sucking it in through the vent 85. An instrument fluid pressure inlet port 86 communicates at all times with the space 87 between the downstream face 88 of the fixed end abutment 73 and the upstream face 77 of the upstream piston device 76. A load port 90 is provided leading to the expansive and contractive working chamber to be operated, such, again for illustration, leading to chamber 173 or 175 of cylinder 170 of Fig. 7, and an exhaust port 91 is provided. These ports all function similarly with movement of the piston device as those of the earlier figures. A by-pass conduit 30′ having a controlled orifice is disposed to establish communication between the chambers at the ends of the housing, as in Fig. 4. It will be seen however that the housing 70 has a uniform bore 71 and that the pistons of the piston device or unit are of the same diameter, for sliding in that bore. Obviously the working area of the upstream face 77 of the upstream piston is predeterminedly smaller than the working downstream face 84 of the downstream piston device 82, so that the functioning is similar to that of the earlier figures.

It will be seen that the containment of the piston unit completely within the housing as just described of Fig. 6 is not essential, and additional benefits can be secured as shown in Fig. 5, by extending the piston rod 78 as at 78′, to pass completely through and beyond the end bore 74′. In Fig. 5 a stop device as shown at 93, can be mounted on the rod extension 78′, for abutment against the face 88′ of end closure member 73′. This modified form provides a protuberance movable beyond the end of the housing enclosure, which if desired can be utilized to actuate other devices such as signal devices or the like to indicate the position of the piston unit. Except for the piston rod extensions and stops, Figs. 5 and 6 are substantially identical and bear similar reference characters.

A further modification of the invention is shown in Fig. 7 in which a double acting or four-way-valve organization is shown in operative association with a working expansion device. This latter will first be described as it is to be understood that it typifies an instrument or agency for coupling with the valves already described constituting the "load" for the load ports. The working device comprises illustratively a cylinder 170 containing the slidable piston 171 having piston rod 172 passing out of the end of the cylinder. While not shown it will be understood that if desired the piston can be biased to a mid position by suitable compression springs bearing between the ends of the cylinder and the faces of the piston. This entire organization can be replaced by expansible bellows or like devices, as the important thing is the provision of a chamber of variable volume 173 on one side of the piston, having a single dual function inlet and exhaust port, indicated diagrammatically at 174, and a chamber of variable volume 175 on the other side of the piston having a single dual function inlet and exhaust port, indicated diagrammatically at 176. While for convenience not so shown in Fig. 7, these respective ports will be located toward or in the ends of the cylinder so as to permit full piston strokes in both directions of axial movement of the rod 172. In the usual arrangement the load ports 36 of Figs. 1 and 2, and 90 of Figs. 5 and 6 will communicate with one given working cylinder port 174 or 176, while the other of said last named ports will communicate with the load port of another valve unit. In such organization as shown in said application two valve units will be organized for complemental bleeding of one valve and throttling of the other to effect reciprocation of the piston in its working stroke. It will be obvious that as the valve snaps in one sense toward one end pressure enters chamber 173 for instance, as the port 176 communicating with the other valve unit is placed in communication with an exhaust port, so that air in chamber 175 is freely vented to the atmosphere as the piston moves under preponderating pressure in chamber 173, and vice versa.

In the form of device shown in Fig. 7, however, both of these functions and full control of the working cylinder unit in both senses may be accomplished with the same single valve organization. In effecting this interesting and important result a housing 180 is provided having the cylindrical bore 181, having end closures respectively 182 having bleed orifice 183 controlled by a flapper valve device 184, and 185 having bleed orifice 186 controlled by flapper device 187. A compound piston device 188 is slidable in the bore 181, and comprises end pistons, respectively 190, having an eccentric axial restricted bore orifice 191, and end piston 192 having an eccentric axial restricted bore orifice 193. On a reduced rod 194, mounting end pistons 190 and 192, intermediate spaced pistons 195 and 196 are mounted, the whole defining plural chambers in the bore.

As shown diagrammatically load port 202 in the housing 180, communicates with the port 174 in working cylinder chamber 173, and load port 203 communicates with port 176 in working cylinder chamber 175. In such mid position of the piston device 188 in the housing 180 of the four way valve it will be seen that the working piston 171 in cylinder 170 is locked against movement in both directions.

Mention has been made of the chamber organization of the piston device and housing. Starting at the left end for convenience the chambers comprise a variable volume chamber 205, between end closure 185 and end piston 190, a first fixed volume chamber 206 between end piston 190 and intermediate piston 195, which is in constant communication with a branch 207 of a fluid pressure inlet system 208, a second or middle fixed volume chamber 210 between intermediate pistons 195 and 196 in constant communication with the exhaust port 211 of the housing 180, a third fixed volume chamber 212 between intermediate piston 196 and end piston 192, also in constant communication with fluid pressure inlet system 208 by branch 213, and finally a second variable volume chamber 214 between end piston 192 and housing end 182.

With flapper valve devices 184 and 187 at the same clearance from their respective bleed orifices and with the parts in the position shown, it will be seen that the fluid pressure from inlet 208 passing into chamber 206 can pass slowly through the axial bore 191 in piston 190 and into end chamber 205. Similarly pressure from the same source passing into chamber 212, passes slowly through axial orifice 193 into the other end chamber 214. As the pressures in chambers 205 and 214 are thus substantially equal, the opposing forces developed by the piston faces juxtaposed to the respective ends of the housing are equal and cancelling and the piston device remains stationary. If during such setting, however, for instance, the flapper valve 184 is opened to vent or increase the bleed rate from chamber 214, then the force developed by this reduced pressure against the face of piston 192 is less than that effective on the face of the other end piston 190 and the piston snaps to the right and abuts the end 182. This moves the intermediate piston 196 from its sealed registry with load port 203, and places the latter in communication with the chamber 210, and, as this is already and constantly in communication with the exhaust port 211, chamber 175 of the working piston and cylinder organization communicates with the exhaust 211 so that resistance to movement of the piston to the right in Fig. 7 is only a function of the frictional resistances in the line. At the same time however intermediate piston device 195 has been moved out of its sealing registry with port 202, placing the latter in communication with chamber 206, and thus in communication with the instrument fluid pressure from line 207, and as said load port 202 is in communication with port 174 of chamber 173 of the working cylinder, the piston 171 therein is forced to the right. With a reversal of the bleed activities of the respective flappers, so that excess pressure is vented from the first chamber 205, the piston snaps to the left, and the pressure and exhaust flows to the working cylinder 170 are reversed and the piston 171 is moved to the left.

With the organization as just described there is considerable elasticity in its operation, in the sense that with independent controls of the flapper devices, the operation of the piston device in the housing is as a function of the instantaneous differential between the pressures in chambers 205 and 214. With one bleed rate fixed by a fixed flapper valve in a partially closed position, for instance, then the differential pressures effective to move the piston in both directions will be secured in both senses by actuation of the other flapper device alone. For accuracy and precision however, it is preferred to couple the flapper devices 184 and 187 for simultaneous movement as reciprocals, so that as one opens the other closes in the same degree, and vice versa.

In the forms of device hitherto described it will be seen that fluid pressure effective axially against one end of the piston device has been opposed by fluid pressure against the other end thereof, with the functioning of the valve being determined by the effective pressures on the piston as functions of pressure and area.

It will be obvious from what has gone before that many modifications of the invention are available within the scope of the basic principles of the invention and all such are to be construed as within the scope of the

We claim:

1. A poppet valve comprising a hollow housing including a first and a second end defining toward the first end a relatively small bore and defining toward the second end a relatively larger bore with said bores in communication, said housing having a gas pressure inlet port communicating with the small bore, having an exhaust port communicating with the small bore in axially spaced relation to the inlet port, and having a load port communicating with the small bore between and in axially spaced relation to both the inlet port and said exhaust port, a valve element slidable in the communicating bores and having a first positively limited position as a result of movement in one sense and a second positively limited position as a result of movement in the other sense, said valve element comprising an effectively integral unit formed of a first single piston of small diameter disposed in the small bore and forming with said small bore and said first end a first pressure chamber, a second single piston of larger diameter disposed in the large bore and forming with said larger bore and said second end a second pressure chamber, and a connecting rod effectively integral with both pistons and maintaining them in axially spaced relation, said connecting rod having an effective diameter smaller than that of either piston to form with the small bore an internal chamber, passage means including a restriction establishing communication between the first and second pressure chambers, said small piston having an axial length and said ports having such axial spacing that in said first position of the valve element said small piston precludes communication between the inlet port and said load port while establishing communication of the latter with the exhaust port through said internal chamber, and so that in said second position it establishes communication between said inlet port and said load port while precluding communication of the latter with said exhaust port, means for venting pressure from said second pressure chamber at a variable rate, whereby when the thrust on the small piston functional with its effective area and the pressure in the first chamber exceeds the opposing thrust on the large piston functional with its effective area and the pressure in the second pressure chamber the valve element snaps to the second position, whereas when the thrust on the large piston exceeds that on the small piston the valve element snaps to the said first position.

2. A poppet valve as recited in claim 1 in which the passage means and the restriction are formed in the piston means.

3. A poppet valve as recited in claim 1 in which the passage means and the restriction are provided as a by-pass between the chambers independent of the piston means.

4. A poppet valve as recited in claim 1 in which the passage means contains a restriction comprising an adjustable needle valve.

5. A poppet valve as recited in claim 1 in which the thrust areas of the respective first and second faces are predeterminedly different and the bore is cylindrical.

References Cited in the file of this patent

UNITED STATES PATENTS

| | | |
|---|---|---|
| 231,214 | Curtis | Aug. 17, 1880 |
| 968,453 | Daellenbach | Aug. 23, 1910 |
| 1,656,132 | Arrasmith | Jan. 10, 1928 |
| 1,791,613 | Clay | Feb. 10, 1931 |
| 2,261,827 | Brown | Nov. 4, 1941 |
| 2,379,483 | Hapgood | July 3, 1945 |